G. C. & C. E. JOHNSON.
DUST SPRAYING MACHINE.
APPLICATION FILED JULY 5, 1911.
1,058,752.
Patented Apr. 15, 1913.
2 SHEETS—SHEET 1.
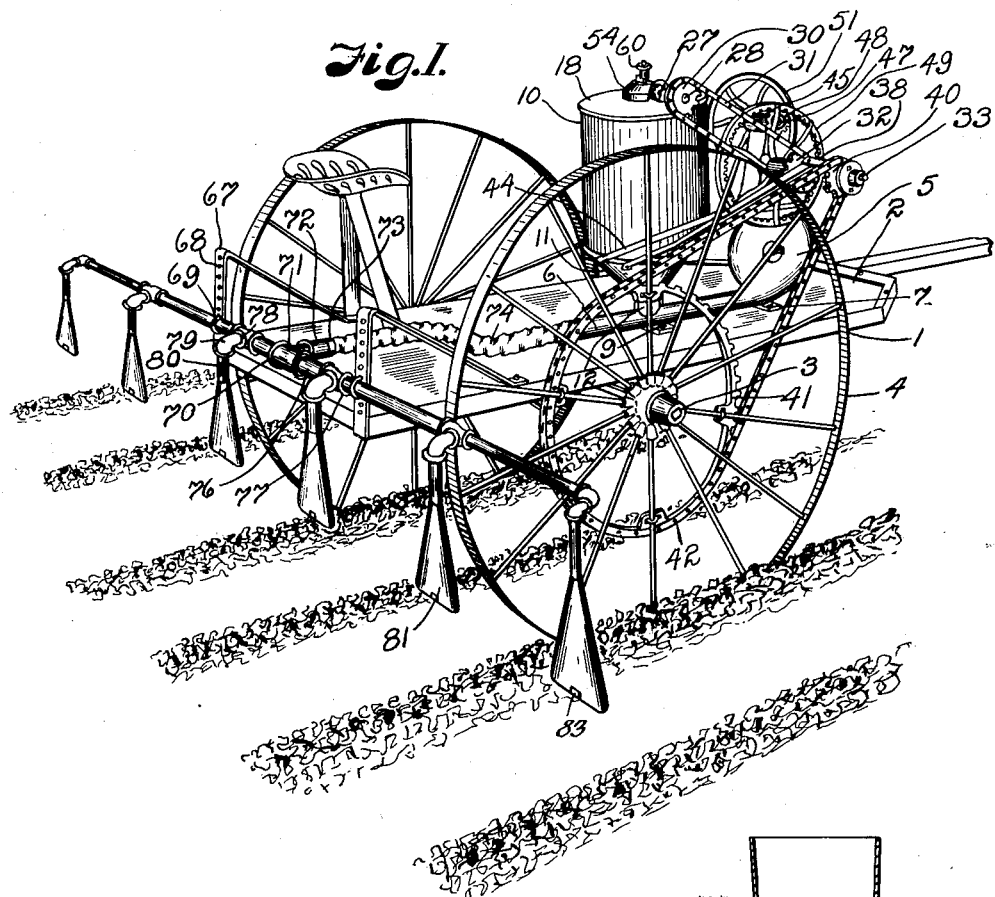
Fig. I.
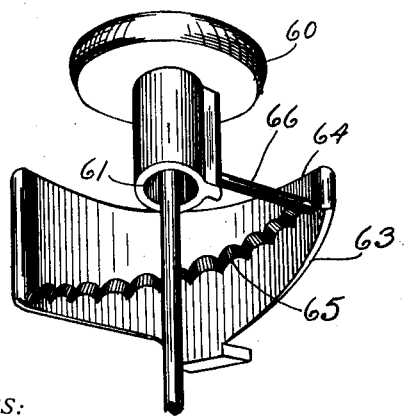
Fig. IV.
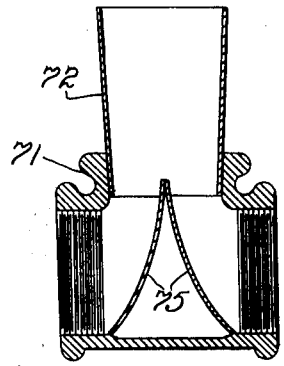
Fig. V.
WITNESSES:
Arthur W. Capps
[signature]
INVENTORS
G. C. Johnson.
C. E. Johnson.
BY
[signature]
ATTORNEY.

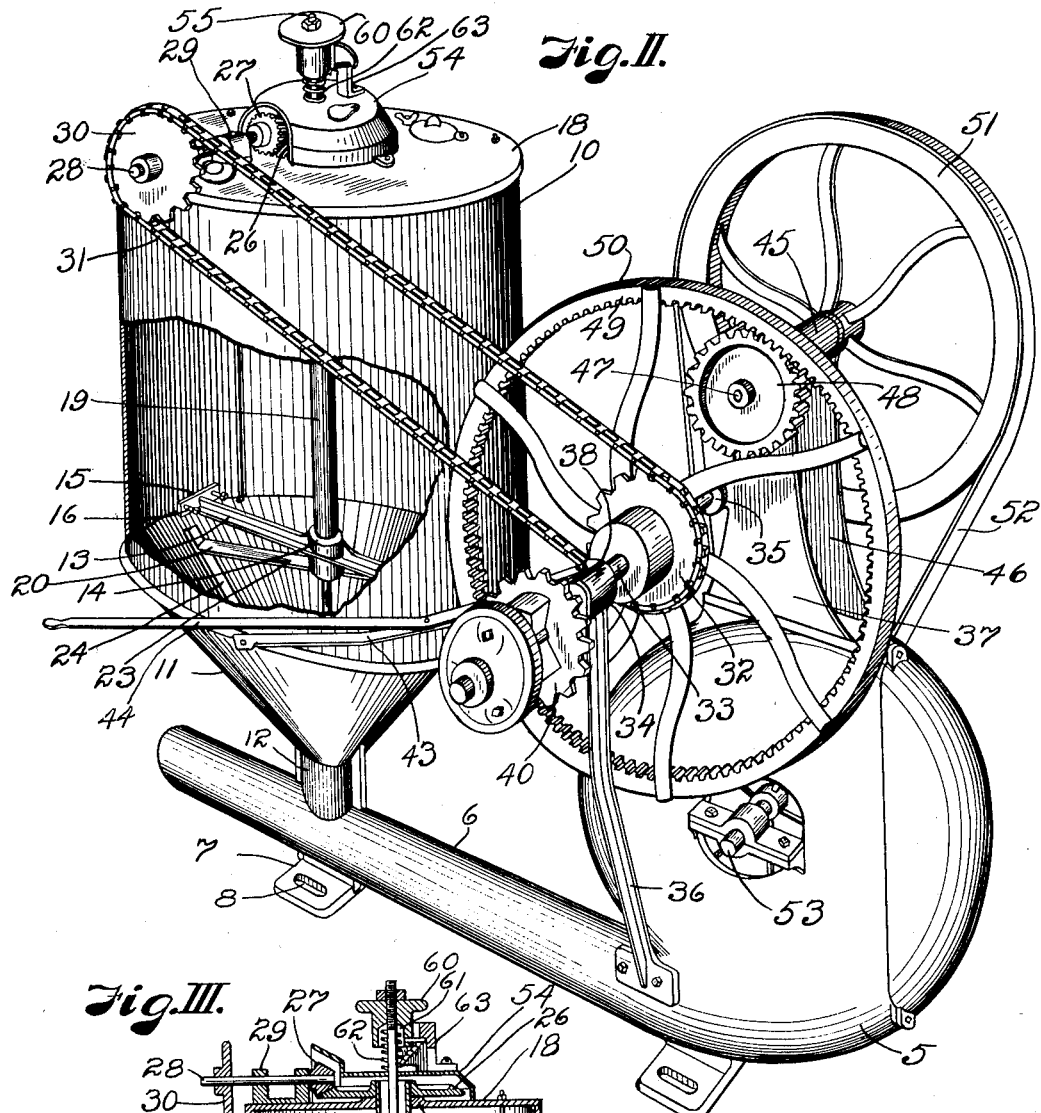
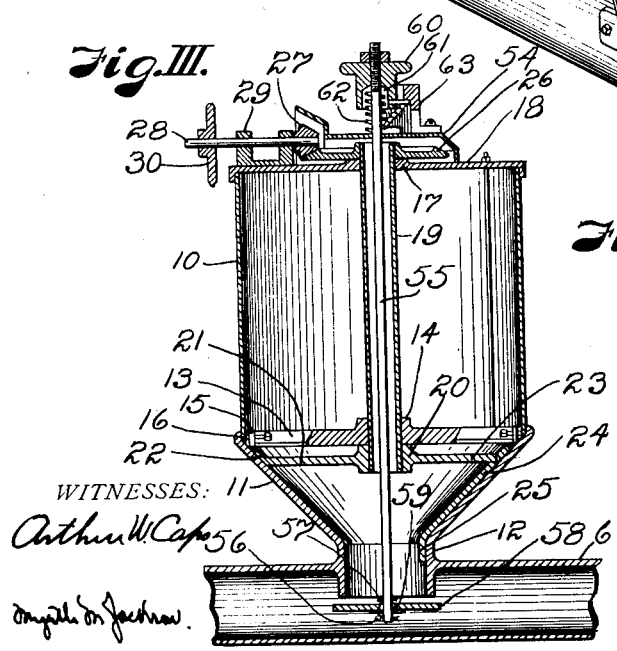
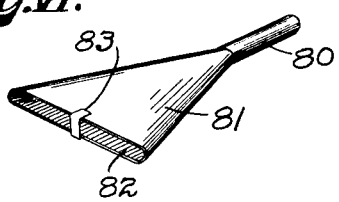

UNITED STATES PATENT OFFICE.

GEORGE C. JOHNSON AND CHARLES E. JOHNSON, OF KANSAS CITY, MISSOURI.

DUST-SPRAYING MACHINE.

1,058,752.   Specification of Letters Patent.   Patented Apr. 15, 1913.

Application filed July 5, 1911. Serial No. 636,867.

*To all whom it may concern:*

Be it known that we, GEORGE C. JOHNSON and CHARLES E. JOHNSON, citizens of the United States, residing at Kansas City, in the county of Jackson and State of Missouri, have invented certain new and useful Improvements in Dust - Spraying Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to dust spraying machines, and more particularly to a machine for spraying potatoes or other root crops, with insecticide or fungicide powder or dust; the principal object of the present invention being to provide a machine whereby a number of rows may be sprayed simultaneously.

Further objects of the invention are disclosed in the accompanying description, wherein reference is made to the accompanying drawings, in which:—

Figure I is a perspective view of a dust spraying machine constructed according to our invention. Fig. II is an enlarged perspective view of the drum and blower with operating mechanism therefor, a part of the drum being broken away to show the interior construction. Fig. III is a central vertical section of the drum. Fig. IV is an enlarged detail view of the valve adjustment. Fig. V is an enlarged central section of the union for dividing the dust as it enters the distributer. Fig. VI is a detail perspective of one of the discharge nozzles.

Referring more in detail to the parts:— 1 designates a cart upon which the working parts of the machine are carried, such vehicle preferably comprising a narrow platform 2, mounted centrally on a single axle 3 having ground wheels 4.

5 designates a blower having a tube 6 provided with base flanges 7 which rest on the cart platform 2 and have elongated slots 8, through which the bolts 9 are projected into the platform, for securing the sprayer parts thereto with limited adjustment. Mounted on the tube 6 is a drum 10, having a hopper bottom 11, provided with a discharge neck 12, which opens into the blower tube 6. At the base of the drum body is a brace 13 having a hub 14 and end flanges 15, which latter bear against the inner face of the drum and have set screws 16 projected therethrough into contact with the drum, for locking the brace in position. Revolubly mounted within the hub 14 and within a hub 17 in the drum top 18, is a tubular shaft 19, the lower end of which projects below the brace 13, and the upper end of which projects above the drum top.

Rigidly fixed to the lower end of shaft 19, is a stirrer 20, one arm 21 of which projects laterally and has an upturned finger 22 wiping the inner surface of the hopper bottom 11. Opposite the arm 21 is an arm 23 having an arm 24 extending downwardly along the face of the hopper bottom and provided with a finger 25, which projects into the neck 12 and wipes the inner surface thereof.

Fixed to the part of the shaft 19 projecting above the top 18, is a beveled gear 26, which meshes with a gear 27, on a shaft 28 that is revolubly mounted in bearings 29 on the top of the drum, and provided with a sprocket 30 which is connected by a chain 31 with a sprocket 32, on a shaft 33 which is journaled in bearings 34—35 on brackets 36—37, carried by the blower 5. Shaft 33 has clutch connection, indicated at 38, with a sprocket 40, which is connected with a sprocket 41 on the axle 3 by a chain 42.

43 designates a brace which is mounted on the bearing 34 and drum 10, and 44 a lever which is pivoted on brace 43 and connected with the clutch 38, whereby the clutch is manipulated to throw the spraying mechanism into and out of operation during the travel of the cart; the details of the clutch not being illustrated as the clutch in itself forms no part of our present invention.

Revolubly mounted in a bearing 45, in the brackets 37—46 on the blower casing, is a shaft 47, having a pinion 48 meshing with an internal gear 49 on a wheel 50, fixed on the drive shaft 33. Also fixed on shaft 47 is a belt wheel 51 having a belt 52 for driving the blower shaft 53.

Covering the beveled gear 26 on the top of the drum cover 18, is a cap 54. Extending through the cap 54, through the tubular shaft 19, within the drum, and through the neck 12 into the tube 6, is a valve rod 55, the lower end of which is provided with the spaced cotter pins 56—57.

58 designates a valve plate having a central aperture 59, through which the lower end of the valve rod is projected; said aperture being of sufficient diameter to permit free movement of the valve plate and allow for irregularities of the plate or lower edge of the neck, so the parts may fit tightly against each other when in closed position, the plate being held permanently between the cotter pins.

Fixed onto the upper end of the rod 55 is a handle 60, having a socket 61 in the bottom, and seated on the cap 54, with its upper end located in the socket 61, is a spring 62, by which the rod 55 is held yieldingly in its upper position and the valve plate 58 is held yieldingly closed against the bottom of the neck 12. Also fixed to the cap 54 is a latch bracket 63, comprising a curved inner plate 64 having its lower edge inclined and provided with the serrations 65, which are adapted to receive a pin 66 on the knob 60 of the valve rod, for the purpose of regulating the feed opening at the bottom of the hopper neck.

On the rear end of the cart platform are standards 67 having apertures 68 therein, and adjustably mounted on said standards, by means of the yokes 69, is a distributer 70, comprising a three-way union 71, the central port of which carries a receiving neck 72 which preferably tapers outwardly from its connection with the union to receive a neck 73 on the flexible section 74 of the blower tube 6. Within the union 71 is a divider 75, the edge of which extends transversely across the union in front of the center of the neck 72, so that powder entering the union will be divided equally between the two ends thereof.

Fixed into the ends of the union are pipe sections 76 which carry reducing unions 77, each of which has a neck 78 provided with an elbow 79 which in turn carries the shank 80, of a nozzle 81; the shank being preferably threaded into the elbow so that it may be turned to direct the nozzle properly over the vegetation which it is desired to spray.

The distributer has an equal number of nozzles at each side of the main union and the conduit decreases in diameter after passing over each separate nozzle, in order to limit the area of the conduit, so that powder may be distributed equally to each individual nozzle.

The nozzles 81 are preferably fan shaped and have elongated mouths 82; the discharge end of each nozzle being preferably braced by a center strap 83.

In using the machine, the drum 10 is filled with dust or insect powder and the valve 58 set to provide the desired discharge opening by seating the pin 66 in the proper serration 65, in the adjustment 63. When the cart is conducted through the field and the clutch is set to operate the blower, powder is delivered from the drum into the blower tube and forced therethrough into the distributer union, where the volume is divided and conducted to the individual nozzles, through which it is blown onto the vegetation, the reduction in each of the nozzle unions insuring a proper and like distribution of the powder to the separate nozzles.

Should the rows be uneven, or should it be necessary to adjust the nozzles to allow for wind, the unions 78 may be turned on the pipe sections 77 and the elbows 79 may be turned on the unions 78, to provide the proper adjustment.

It is apparent that the entire distributer may be adjusted vertically on the standards 67 to accommodate the nozzles to the height of the vegetation, and it is also apparent that the amount of powder distributed may be regulated by manipulation of the valve 58.

Having thus described our invention, what we claim as new therein and desire to secure by Letters-Patent is:—

1. In a dust spraying machine, a distributer comprising a union having an intake port and lateral discharge ports extending laterally relative thereto, a V-shaped member having its point extending across the center of the intake port, and having its blades concaved and terminating adjacent to the mouths of the discharge ports, conduits connected with the lateral union ports, nozzles carried by said conduits, and means for delivering powder under pressure to the intake port of said union.

2. In a dust spraying machine, a distributer comprising a conduit made up of tubes of varying diameters, reducing unions connecting said tubes of varying diameters, elbows connected with said reducing unions, nozzles connected with said elbows, and means for delivering powder to said conduit under pressure.

3. In a dust spraying machine, a conduit comprising a receiving union, a plurality of tubes of gradually diminishing diameter, tapered reducing unions connecting said tubes and having threaded connection therewith, elbows having threaded connection with said reducing unions, nozzles carried by said elbows, and means for delivering powder to said conduit under pressure.

4. In a dust spraying machine, a suitable vehicle, having spaced standards provided with supporting members adapted for vertical adjustment thereon, a distributer comprising a central pipe member and end sections of gradually diminishing diameter extending from the central member, the distributer being rigid throughout its length and mounted on the adjustable supporting members, nozzles carried by the distributer, a tank on said vehicle, connection between the tank and distributer, and a blower for forcing dust from the tank through said distributer.

In testimony whereof we affix our signatures in presence of two witnesses.

GEORGE C. JOHNSON.
CHARLES E. JOHNSON

Witnesses:
MYRTLE M. JACKSON,
ARTHUR W. CAPS.

Copies of this patent may be obtained for five cents each, by addressing the "Commissioner of Patents, Washington, D. C."